(12) United States Patent
Wesseloh (10) Patent No.: US 11,897,614 B2
(45) Date of Patent: Feb. 13, 2024

(54) MULTI-PURPOSE PASSENGER AIRCRAFT, USE THEREOF, OPERATION METHOD THEREFORE AND PASSENGER AIRCRAFT SERIES

(71) Applicant: Airbus Operations GmbH, Hamburg (DE)

(72) Inventor: Marc Wesseloh, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 17/886,982

(22) Filed: Aug. 12, 2022

(65) Prior Publication Data
US 2023/0068098 A1   Mar. 2, 2023

(30) Foreign Application Priority Data
Aug. 18, 2021   (EP) ..................... 21191972

(51) Int. Cl.
*B64D 1/18*   (2006.01)
*B64C 1/20*   (2006.01)

(52) U.S. Cl.
CPC .  *B64D 1/18* (2013.01); *B64C 1/20* (2013.01)

(58) Field of Classification Search
CPC ................ B64D 1/16; B64D 1/18; B64C 1/20
See application file for complete search history.

(56) References Cited

U.S. PATENT DOCUMENTS

| | | | |
|---|---|---|---|
| 2005/0072880 A1* | 4/2005 | Nolan | B64D 1/16 244/136 |
| 2008/0035648 A1 | 2/2008 | Nolan | |
| 2014/0224935 A1* | 8/2014 | Lazes | B64D 1/16 244/136 |
| 2021/0221509 A1 | 7/2021 | Hiller | |

FOREIGN PATENT DOCUMENTS

| | | |
|---|---|---|
| DE | 202021000171 U1 | 2/2021 |
| JP | 2009107609 A | 5/2009 |
| RU | 4278 U1 | 6/1997 |
| WO | 2005032937 A2 | 4/2005 |

OTHER PUBLICATIONS

European Search Report; priority document.
Wikipedia; Schmalrumppfflugzeug; 4 pages.
Wikipedia; Unit Load Device dated Aug. 10, 2021; 11 pages.
Airbus, Additional Center Tanks (ACT), Flight Operations dated Aug. 11, 2021; 3 pages.
Firefighting Aircraft: Recognition Guide; 48 pages.
Airbus, A320 Family dated Aug. 10, 2021; 5 pages.

\* cited by examiner

*Primary Examiner* — Philip J Bonzell
*Assistant Examiner* — Ashesh Dangol
(74) *Attorney, Agent, or Firm* — Greer, Burns & Crain, Ltd.

(57) ABSTRACT

An aircraft usable as a passenger aircraft and a fire fighter aircraft. The passenger aircraft includes a passenger area with passenger seats and a permanently installed fire extinguishing medium tank for storing fire extinguishing medium such as water, as well as a fire extinguishing medium nozzle for discharging the fire extinguishing medium. The passenger aircraft may be a type from an aircraft series also including a long-haul aircraft having a center tank for range extension. In the passenger aircraft, a center tank may be used as an extinguishing medium tank.

11 Claims, 7 Drawing Sheets

MULTI-PURPOSE PASSENGER AIRCRAFT, USE THEREOF, OPERATION METHOD THEREFORE AND PASSENGER AIRCRAFT SERIES

CROSS-REFERENCES TO RELATED APPLICATIONS

This application claims the benefit of the European patent application No. 21191972.5 filed on Aug. 18, 2021, the entire disclosures of which are incorporated herein by way of reference.

FIELD OF THE INVENTION

The invention concerns a passenger aircraft comprising a passenger cabin with at least twenty passenger seats and a cargo deck. Furthermore, the invention concerns a passenger aircraft series including such a passenger aircraft. Furthermore, the invention concerns a method and a use for firefighting.

BACKGROUND OF THE INVENTION

For the clarification of terminology, the technological background and the prior art, reference is made to the following references:

[1] A321neo-A320 Family—Airbus, https://www.airbus.com/aircraft/passenger-aircraft/a320-family/a321neo.html, downloaded on Oct. 8, 2021

[2] WO 2005/032937 A2

[3] DE 20 2021 000 171 U1

[4] Firefighting Aircraft Recognition Guide, brochure of the California Department of Forestry and Fire Protection, downloaded on Oct. 8, 2021 under https://www.fire.ca.gov/media/4950/aviation-guide-2019-access.pdf

[5] Unit Load Device—Wikipedia, https://de.wikipedia.org/wiki/Unit_Load_Device, downloaded on Aug. 10, 2021

[6] Additional Center Tanks (ACT)—Website of Airbus, downloaded on Nov. 8, 2021, https://services.airbus.com/en/flight-operations/system-upgrades/operations-extension/additional-center-tanks-act.html

[7] Narrow-body aircraft—Wikipedia, https://de.wikipedia.org/wiki/Schmalrumpfflugzeug, downloaded on Nov. 8, 2021

Passenger aircraft in the form of narrow-body aircraft (single aisle) with a passenger cabin and a cargo deck are known from [1]. Such a type of passenger aircraft has so far been used mainly on short-haul or medium-haul routes. As described in [1], such passenger aircraft can be configured for extended range by permanently installing an additional fuel tank. For example, the A321XLR has an additional permanent tank in the fuselage area behind the wings, and another optional tank can be installed in the fuselage area in front of the wings. This increases the range to over 8000 kilometers. Due to its arrangement in the fuselage area behind the wings, such a tank is also called a rear center tank. Furthermore, it is known from [6] that the range can also be extended by additional center tanks (ACT).

SUMMARY OF THE INVENTION

An object of the invention is to provide a passenger aircraft of the type known from [1] with extended application possibilities.

The invention creates, according to a first aspect, a passenger aircraft, comprising a passenger cabin with at least twenty passenger seats and a cargo deck, as well as a permanently installed extinguishing medium tank for receiving an extinguishing medium, in particular, extinguishing water, for firefighting major fires and at least one extinguishing medium nozzle connected to the extinguishing medium tank for distributing the extinguishing medium over the major fire.

It is preferred that the extinguishing medium tank is housed below the passenger cabin.

It is preferred that the extinguishing medium tank is housed in an area of a fuselage of the passenger aircraft that extends from the wings to a rear cargo hold of the cargo deck.

It is preferred that the extinguishing medium tank has a tank volume of at least 600 liters.

It is preferred that the extinguishing medium tank has a tank volume between 1000 l and 20000 l.

It is preferred that the extinguishing medium tank is an extinguishing water tank for receiving extinguishing water as an extinguishing medium.

It is preferred that the extinguishing medium tank is the rear center tank of the passenger aircraft.

It is preferred that the cargo deck has several receiving locations for receiving and anchoring further mobile extinguishing medium containers.

Preferably, the extinguishing medium containers are formed as ACTs as described and shown in [6].

It is preferred that the cargo deck has several more removably anchored extinguishing medium containers, which are in fluid connection with the extinguishing medium tank.

It is preferred that the cargo deck has a front cargo hold in front of the extinguishing medium tank and a rear cargo hold behind the extinguishing medium tank.

It is preferred that the cargo deck is designed to receive and anchor one to twenty extinguishing medium containers, each with an extinguishing medium volume of 400 l to 4000 l.

It is preferred that the cargo deck has extinguishing medium lines that can be connected to extinguishing medium containers and are connected to the extinguishing medium tank and/or the extinguishing medium nozzle.

It is preferred that the passenger cabin has 10 to 50 rows of passenger seats.

It is preferred that the passenger cabin is in the form of a single-aisle passenger cabin.

In a preferred embodiment, the passenger aircraft comprises at least one camera for observing the area below the passenger aircraft.

In a preferred embodiment, the passenger aircraft comprises at least one extinguishing system operator workstation for an operator with a human-machine interface for operating the extinguishing medium nozzle and/or controllers and/or peripheral devices of the extinguishing medium tank and the extinguishing medium nozzle.

In a preferred embodiment, the passenger aircraft comprises a pumping device for the transport of an extinguishing medium from and to the extinguishing medium tank and/or to the at least one extinguishing medium nozzle.

In one design, the pumping device is a mobile pumping device that can be installed therein in the event of the passenger aircraft being used for firefighting and can remain on the ground for the normal operation of the passenger aircraft. In a different design, the pumping device is permanently installed.

Preferably, the pumping device comprises at least one pump for the extinguishing medium and connecting lines.

In a preferred embodiment, the passenger aircraft comprises ventilation of the extinguishing medium tank for feeding air when discharging the extinguishing medium.

In a preferred embodiment, the passenger aircraft comprises one or more additional extinguishing medium containers in the form of a unit load device for use in firefighting. For the definition of a unit load device, see [5], incorporated herein by reference. Such extinguishing medium containers can be installed in the cargo deck with optimal use of space with conventional cargo loaders for firefighting and can be removed for normal operation.

In a preferred embodiment, the passenger aircraft comprises an extinguishing medium line system with pipelines and valves for discharging an extinguishing medium and for filling the extinguishing medium tank.

In a preferred embodiment, the passenger aircraft comprises a heating device for the extinguishing medium tank. This means that ice formation in the extinguishing water tank during flight to the deployment location can be avoided even when flying at higher altitudes or at low temperatures.

In a preferred embodiment, the passenger aircraft comprises a liquid filling system for filling the extinguishing medium tank.

In a preferred embodiment, the passenger aircraft comprises an air pressure system for controlling the pressure in the extinguishing medium tank. Preferably, the air pressure system is designed to increase the pressure by blowing in pressurized air or the like to support the discharge of an extinguishing medium. Preferably, the air pressure system comprises at least one source of compressed air, for example comprising a compressor and/or compressed air cylinders. Preferably, the air pressure system comprises at least one air line that opens into an upper area of the extinguishing medium tank. Preferably, the air pressure system includes air pressure control elements, such as valves, and an air pressure controller.

In a preferred embodiment, the passenger aircraft comprises a fire extinguishing medium additive for use in firefighting. For this purpose, the usually red fire extinguishing medium additive can be filled together with the extinguishing medium into the extinguishing medium tank. Alternatively or additionally, the fire extinguishing medium additive can be added to an extinguishing medium, such as, in particular, water, on board, for example from a fire extinguishing medium source installed there permanently or only for firefighting use.

It is preferred that the extinguishing medium nozzle opens outwards below the fuselage.

It is preferred that the extinguishing medium nozzle is arranged behind the wings It is preferred that the extinguishing medium nozzle has a valve for opening and closing.

It is preferred that the extinguishing medium nozzle is designed for discharging the contents of the extinguishing medium tank or of the extinguishing medium tank and any additional extinguishing medium container in one shot.

According to a further aspect, the invention concerns a use of a center tank, which is permanently installed in a fuselage of a passenger aircraft having a passenger cabin with passenger seats, as an extinguishing medium tank for firefighting.

According to a further aspect, the invention creates an operating method for a passenger aircraft according to one of the above embodiments, including:

operating the passenger aircraft as a commercial aircraft for the transport of passengers in normal operation, and, in the event of a major fire, filling the extinguishing medium tank with an extinguishing medium and operating the passenger aircraft as a firefighting aircraft.

In both of the aforementioned further aspects, it is preferred that the passenger cabin is in the form of a single-aisle passenger cabin.

It is preferred that for the operation of the passenger aircraft as a firefighting aircraft at least one additional extinguishing medium container is installed in the cargo hold.

It is preferred that the extinguishing medium is discharged according to one of the following modes of operation:

(a) discharging the contents of the extinguishing medium tank in one shot;

(b) discharging the contents of the extinguishing medium tank and at least one additional extinguishing medium container in one shot;

(c) discharging the contents of the extinguishing medium tank, pumping further extinguishing medium from at least one additional extinguishing medium container into the extinguishing medium tank and then discharging the refilled contents of the extinguishing medium tank.

According to a further aspect, the invention creates a passenger aircraft series including several passenger aircraft with the same external body including fuselage, landing gear, wings, tail, and control surfaces, wherein a passenger cabin for accommodating passenger seats, a cargo deck and a center tank of the same contour, arrangement and dimensions is arranged in the same fuselage in each case, wherein the passenger aircraft series includes a long-haul passenger aircraft with extended range, in which the center tank is designed for use as an additional fuel tank, and a passenger aircraft that can be used as an additional firefighting aircraft according to one of the above embodiments, wherein the center tank is the extinguishing medium tank.

Preferably, the passenger aircraft series further includes a passenger aircraft usable in addition to its function for passenger transport as a tanker aircraft, in which the center tank is designed as a liquid tank for the delivery of liquid from a supply point to a remote station.

Preferably, the passenger aircraft series further comprises a short-haul or medium-haul passenger aircraft that corresponds to the other passenger aircraft, but without the additional center tank.

Airplanes of the narrow-body aircraft passenger aircraft series are preferred.

Advantageous embodiments of the invention relate to an aircraft that can be used for different purposes without major conversion measures. In particular, a multi-purpose aircraft is proposed that can be used both as a passenger aircraft, in particular for short-haul or medium-haul flights, and as a firefighting aircraft.

In the case of preferred embodiments, it is proposed to use a tank permanently installed for the corresponding type of aircraft (aircraft of the same aircraft series) to extend the range as an extinguishing medium tank for use in firefighting.

Thus, such aircraft can be manufactured in series production and, with only minor modifications, can be used either as commercial aircraft with extended range or as multi-purpose aircraft with a tank that can be used for other purposes.

Some specific exemplary embodiments are based on an aircraft model of the A321XLR type or comparable narrow-body passenger aircraft with an additional center tank, in particular, a rear center tank. Advantageously, the additional center tank or rear center tank is used as an extinguishing medium tank for firefighting.

It is also conceivable to use the additional tank for other purposes, for example to transport liquids such as fuel to remote stations.

The first prototypes of the A321XLR have an aluminum rear center tank. Future examples will be equipped with a rear center tank made of fiber-metal laminate. Both versions of the rear center tank are well suited as extinguishing medium tanks (it could also be used to transport fuel to remote stations).

A possible use as a firefighting aircraft expands the functionality of the aircraft.

Additional tanks, preferably in the form of tank containers, more preferably as ULDs, see [5], and/or as ACTs, see [6], which are arranged in the cargo deck, can increase the liquid volume capacity that can be used for an extinguishing medium or the like.

With only minor modifications, the aforementioned prototypes can be converted into a multi-purpose aircraft for passenger transport and firefighting.

The passenger aircraft can also be produced and used as a multi-purpose aircraft right from the start.

It is also possible to use the passenger aircraft initially only as a commercial aircraft on short, medium, and long-haul routes using the tank in the fuselage as a fuel tank to extend the range. At a later stage of its service life, the passenger aircraft can be converted into a multi-purpose aircraft by only small conversions in order to then use the tank as an extinguishing medium tank (second life).

Preferred embodiments of the invention have one or more of the following features:

Multiple use of the aircraft (passenger aircraft or firefighting aircraft)

lower cost per flight hour (no unprofitable times)

the tank equipment, including for example pumps, can be accommodated in the hold, no special airport support is necessary a new purpose has been created for existing prototypes/long-range narrow-body aircraft the passenger-firefighting aircraft can be used as a passenger aircraft in daily (normal) operation without restrictions in the event of a major fire, it is possible to convert the passenger-firefighting aircraft in a very short time frame to allow its use as a firefighting aircraft in the case of one design, only the additional extinguishing medium containers are installed for this purpose use without additional extinguishing medium containers is possible for rapid use with correspondingly reduced extinguishing medium capacity dual use as a passenger and firefighting aircraft is not possible for most aircraft known to date the firefighting aircraft used so far, as described and shown in [4], are only required in the event of fire and are not used for the rest of the time, but must always be serviced and maintained to maintain operational readiness the passenger aircraft according to preferred embodiments of the invention has disadvantages compared to a version without the additional permanently installed tank in terms of usable cargo space and payload, but is far more economical than a pure firefighting aircraft experience with major fires in southern Europe in the summer of 2021 has shown that it is difficult and time-consuming to bring in enough special aircraft to fight fires in the event of major fires; with the combination aircraft, a larger distribution of firefighting aircraft can already be created through daily operation unlike the aircraft described and shown in [2] and [3], the passenger aircraft according to embodiments of the invention has a large permanently installed extinguishing medium tank with the possibility of rapid expansion by additional extinguishing medium containers and can thus be used as a passenger aircraft and as a firefighting aircraft with much shorter changeover times In addition to the transport of an extinguishing medium, it is also possible to transport other liquids. It would also be conceivable to use the aircraft to supply remote areas with water or with fuel, such as gasoline or diesel or heating oil.

BRIEF DESCRIPTION OF THE DRAWINGS

An exemplary embodiment is explained in more detail below on the basis of the attached drawings. In the figures.

DETAILED DESCRIPTION OF THE PREFERRED EMBODIMENTS

Figure 1:
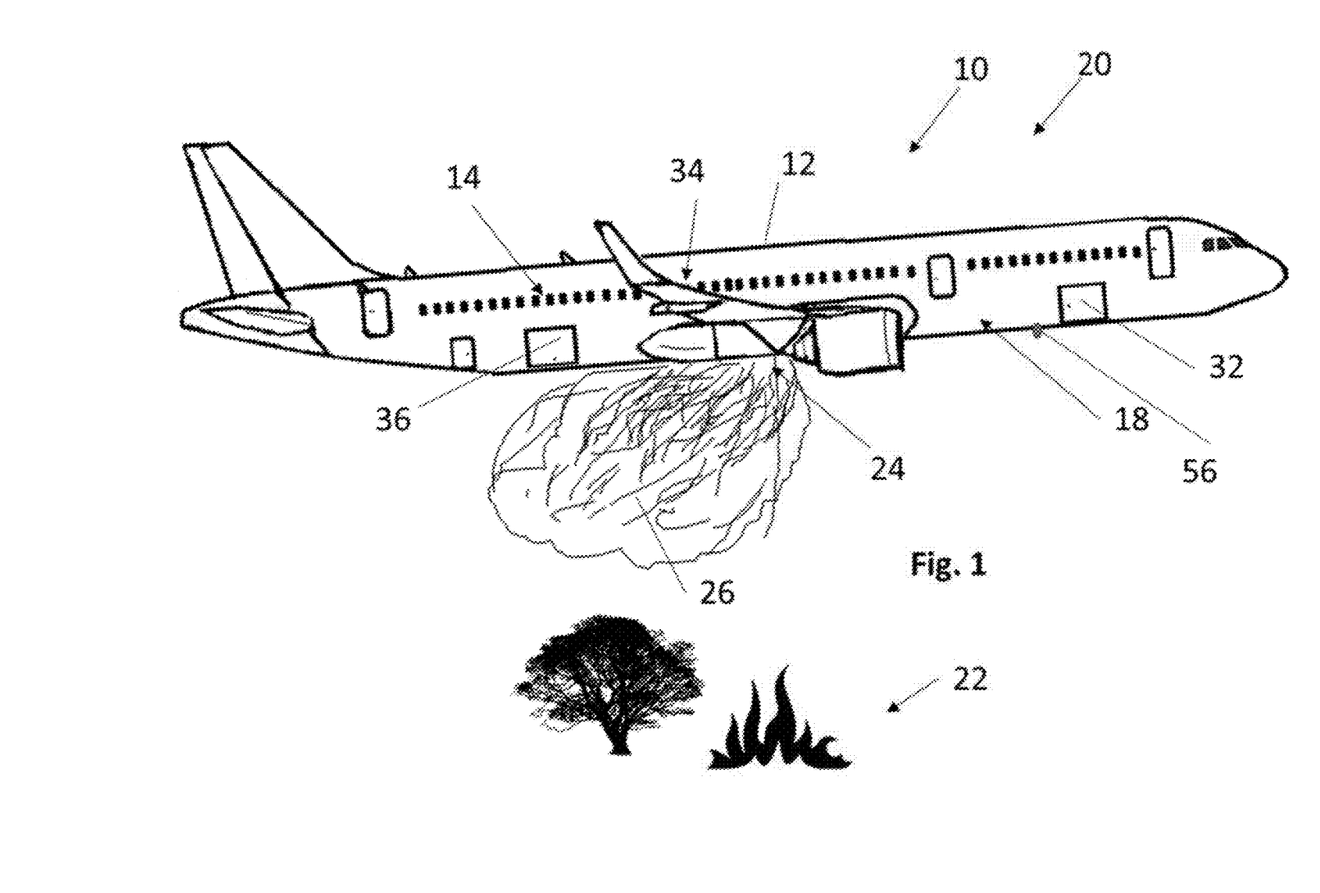
FIG. 1 shows a schematic perspective view of an exemplary embodiment of a passenger aircraft, which is also designed as a firefighting aircraft, in an operation to combat a major fire.
Figure 2:
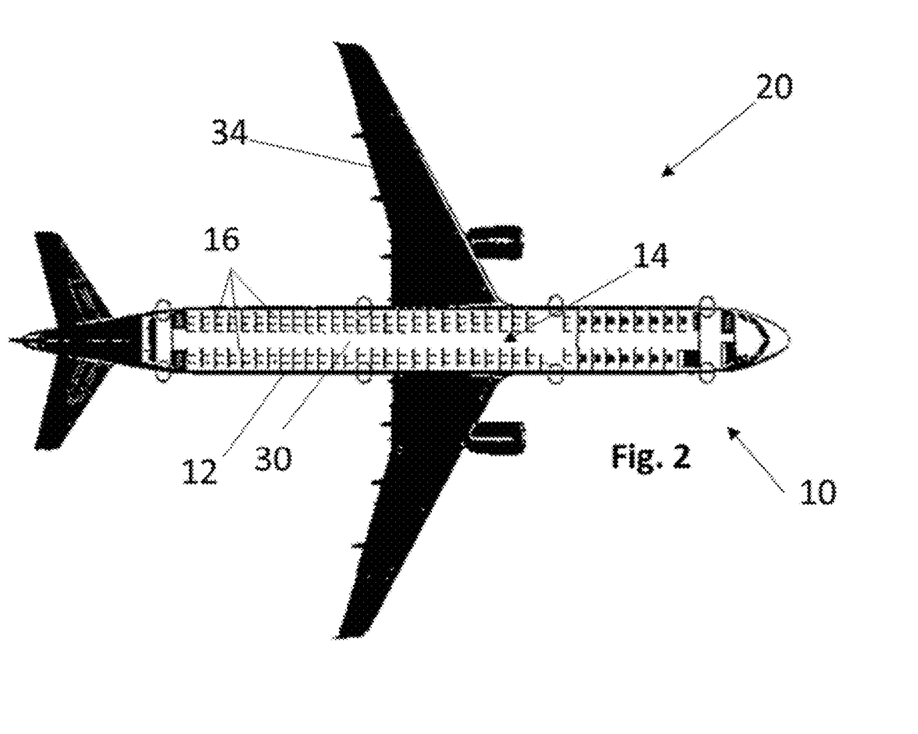
FIG. 2 shows a partially sectional top view of the passenger aircraft, with an upper part cut away to represent the passenger cabin of the passenger aircraft.
Figure 3:
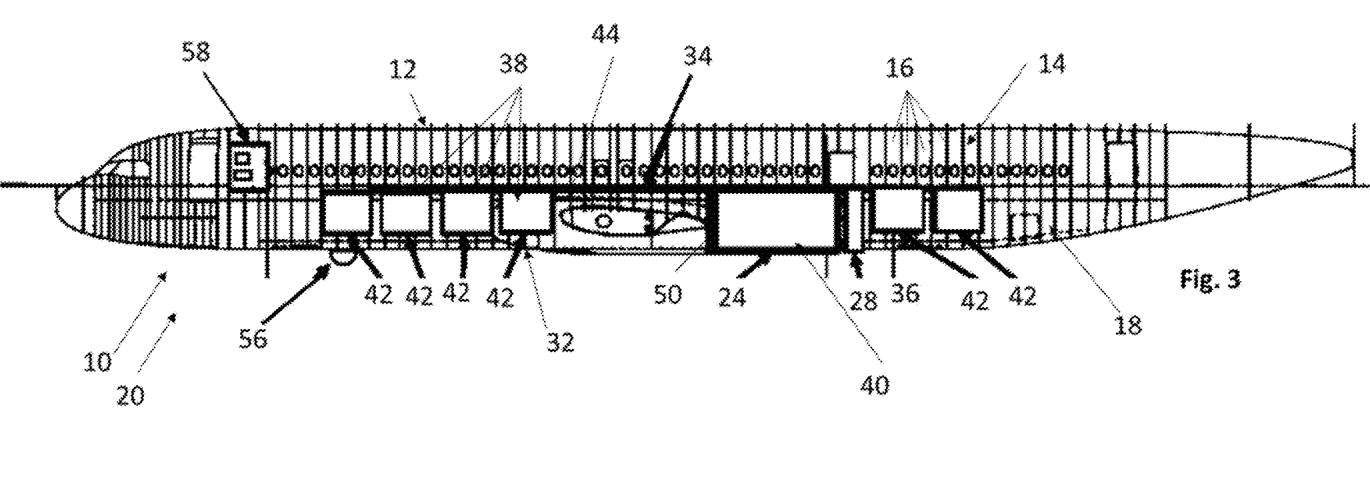
FIG. 3 shows a schematic side view, partly in section, of a fuselage of the passenger aircraft, with firefighting aircraft equipment having a permanently installed center tank as an extinguishing medium tank and, if necessary, additional extinguishing medium containers installed in a cargo deck.

FIGS. 1 to 3 show a passenger aircraft 10 having a passenger cabin 14 with at least twenty passenger seats 16 accommodated in the upper part of a fuselage 12 and a cargo deck 18 arranged in the lower part of the fuselage 12.

In addition to its purpose for transporting passengers, the passenger aircraft 10 can also be used as a firefighting aircraft 20 to fight a major fire 22, such as a forest fire or a wildfire on the ground.

For this purpose, the passenger aircraft 10 has a permanently installed extinguishing medium tank 24 for holding an extinguishing medium 26, such as in particular extinguishing water, for firefighting and at least one extinguishing medium nozzle 28 connected to the extinguishing medium tank 24 for distributing the extinguishing medium 26 over the major fire 22.

The passenger aircraft and firefighting aircraft 10, 20 is in the form of a narrow-body aircraft, wherein the passenger seats 16 of the passenger cabin 14 are arranged in ten to fifty, preferably 20 to 40 rows to the left and right of the single central aisle 30.

The cargo deck has a front cargo hold 32 in front of the wings 34 and in front of the landing gear (not shown) housed in the area of the wing 34 and a rear cargo hold 36. The extinguishing medium tank 24 is located directly behind the area for the landing gear and in front of the rear cargo hold 36 in the lower area of the fuselage 12, below the passenger cabin 14. The cargo holds 32, 36 are equipped with several receiving locations 38 for receiving Unit Load Devices (ULD—see [5]), for example of type LD3, and with a corresponding cargo loading system and anchorages (not shown).

A preferred specific design of the passenger aircraft 10 is based on the type A321XLR, a narrow-body aircraft of the Airbus A320 Family (i.e., a passenger aircraft series), whose range has been extended by an additional fuel tank permanently installed in the area behind the wings in the lower part of the fuselage—due to its position in the central fuselage area behind the wings referred to as a rear center tank, RCT for short. The passenger aircraft 10, which can also be used as a firefighting aircraft 20, is manufactured accordingly as the A321XLR, but the rear center tank with a capacity of 12900 l is used as an extinguishing medium tank 24. For further details on possible dimensions and other features of the preferred embodiment of the passenger aircraft, reference can therefore be made to [1]. The passenger aircraft series with the designation A321 also includes a narrow-body aircraft without the RCT for use as a commercial aircraft on short-haul and medium-haul routes.

The extinguishing medium tank 24 and the extinguishing medium nozzle 28 are parts of firefighting aircraft equipment 40 of the passenger aircraft 10, which is explained in more detail below on the basis of the illustrations of FIGS. 3 to 6.

As shown in FIGS. 3 to 6, the firefighting aircraft equipment 40 has, in addition to the rear center tank used as an extinguishing medium tank 24 and the extinguishing medium nozzle 28, one, more or all of the following units: at least one extinguishing medium container 42, an extinguishing medium line system 44, a pumping device 46, a ventilation system 48, a heating device 50, a liquid filling system 52, a system 54 for the addition of a fire extinguishing medium additive, a camera 56, an operator workstation 58 and a controller 60.

Figure 5:
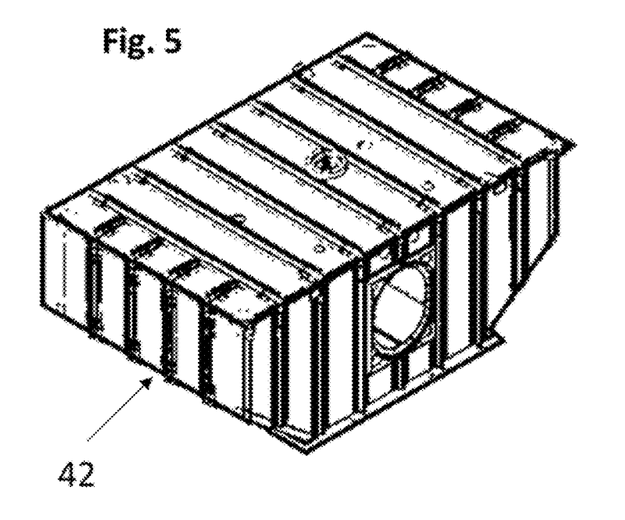
FIG. 5 shows a perspective view of an exemplary embodiment of an additional extinguishing medium container.

In the exemplary embodiment shown, several extinguishing medium containers 42 are provided, which are not permanently carried in the passenger aircraft 10 but are standardized for receiving on the receiving locations 38 of the front and rear cargo holds 32, 36 as ULD containers (see [5]). For example, four extinguishing medium containers 42 in the front cargo hold 32 and two extinguishing medium containers 42 in the rear cargo hold 36 will be installed for firefighting. In particular, the extinguishing medium containers 42 are constructed in the same way as the ACTs described and shown in [6].

In a specific exemplary embodiment, each extinguishing medium container 42 has a volume of 2992 l usable for an extinguishing medium 26. In the specific exemplary embodiment, this results in a total volume usable for an extinguishing medium 26 of 1*12900 l+6*2992 l=30852 l. Of course, this is only one example, different values may result depending on the size of the fuselage 12, the number and size of the extinguishing medium containers 42 possibly used and the size of the center tank permanently installed as an extinguishing medium tank 24.

The extinguishing medium containers 42 expand the liquid capacity as additional tanks installed in the cargo deck 18.

In the preferred embodiment based on the passenger aircraft series A320/A321/A319, the rear center tank used as an extinguishing medium tank 24, which is used in other passenger aircraft of the same passenger aircraft series as a fuel tank for range extension, together with six additional extinguishing medium containers 42 in the form of ACTs, enables a liquid capacity for an extinguishing medium of 30852 l. The ACTs offered as an option for the A319ACJ were used as the basis for calculating the capacity of the extinguishing medium containers 42.

Figure 4:
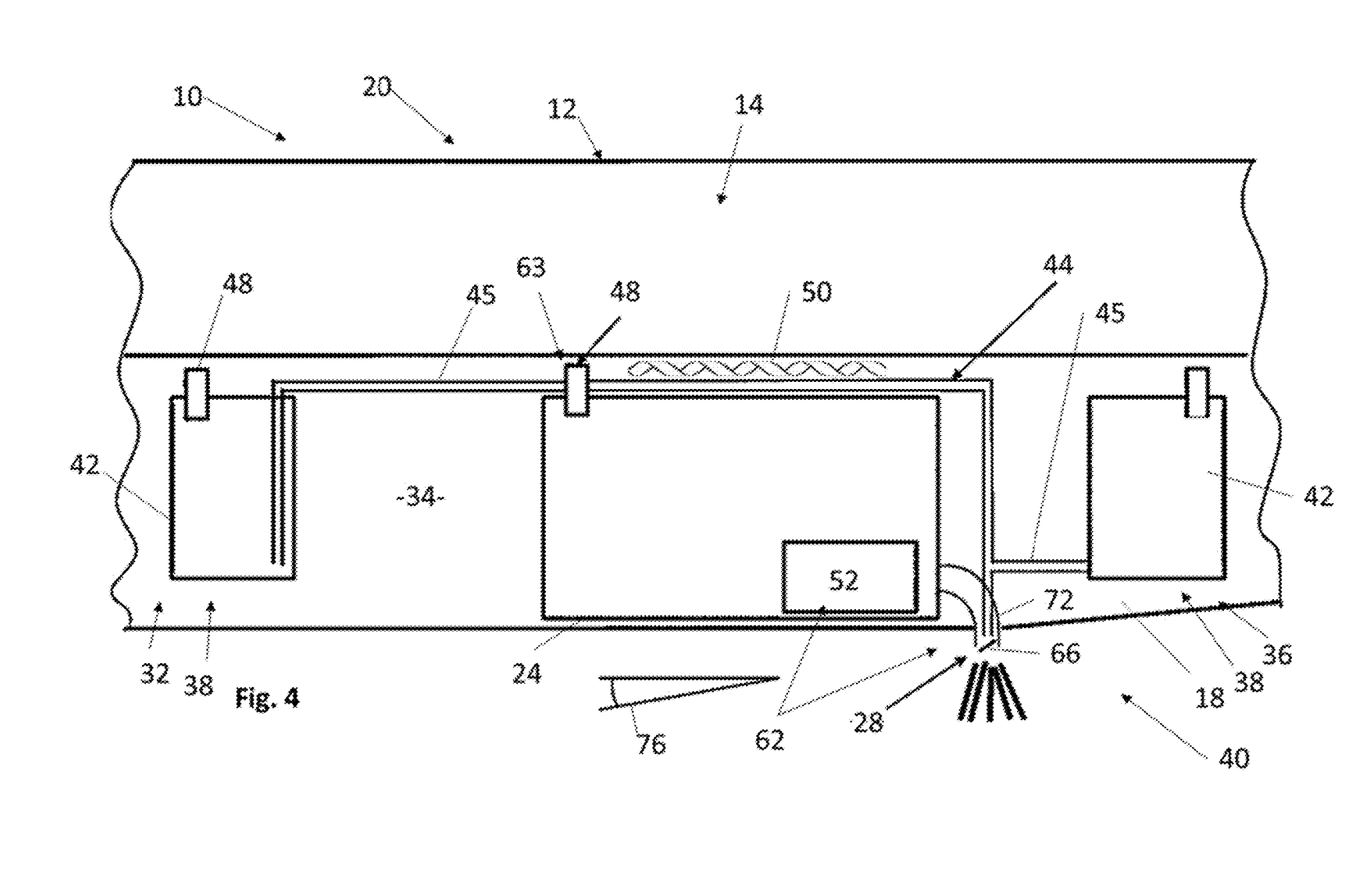
FIG. 4 shows a schematized block view of a central part of the fuselage to represent an exemplary configuration of the firefighting aircraft equipment.

The following are additionally installed in the preferred design to form a firefighting aircraft 20:
a liquid filling system 52 and a discharge pipe 74 and discharge valves 66
a ventilation system 48 for supplying air to tanks 24, 42 to avoid structural damage
a tank heating device 50 to prevent ice formation
a system 54 for adding an extinguishing medium additive (red) to mark the fire fighting on the ground During firefighting operations, the angle of attack 76 allows the main tank—extinguishing medium tank 42—to be completely emptied.

The liquid capacity is at a top level compared to other firefighting aircraft; only two of the known firefighting aircraft, for example firefighting aircraft mentioned in [4], have a greater capacity, as shown in the following Table 1, and of these, for example, the B747 tanker, which has been completely converted into a firefighting aircraft and can only be used as a firefighting aircraft, cannot operate from small airports, which are usually closest to a major fire. In Table 1, the preferred embodiment of the passenger aircraft, which can also be used as a firefighting aircraft 20, is referred to as "A321FF (fire fighter)"

The passenger aircraft 10 shown here in an additional form for use as a firefighting aircraft 20 continues to enable the typical use as a passenger aircraft, wherein the second function as a firefighting aircraft 20 only needs to be used in a case of a major fire 22. This dual function is much more economical than a typical firefighting aircraft which waits to be used.

In a preferred design, only the additional extinguishing medium containers 42 are loaded and installed for a quick transition from pure passenger operation to operation as a firefighting aircraft.

TABLE 1

Comparison of the extinguishing medium capacity of the preferred embodiment of the passenger aircraft 10 shown here with that of other firefighting aircraft

| Aircraft | Gallons | Liters |
|---|---|---|
| CL-215/Bombardier 415 "Super scooper" | 1621 | 6136 |
| C295 Airbus | 1850 | 7000 |
| Lockheed P-2 Neptune | 2700 | 10220 |
| Douglas DC-6 | 2800 | 10220 |
| Lockheed C130 Airtanker - Modular Airborne Fire-fighting System | 3000 | 11356 |
| Lockheed P-3 Orion | 3000 | 11356 |
| Martin Mars | 7200 | 27254 |
| A321FF (fire-fighter) | 8150 | 30852 |
| DC-10 | 12000 | 45424 |
| Boeing 747 | 24000 | 90849 |

Figure 6:
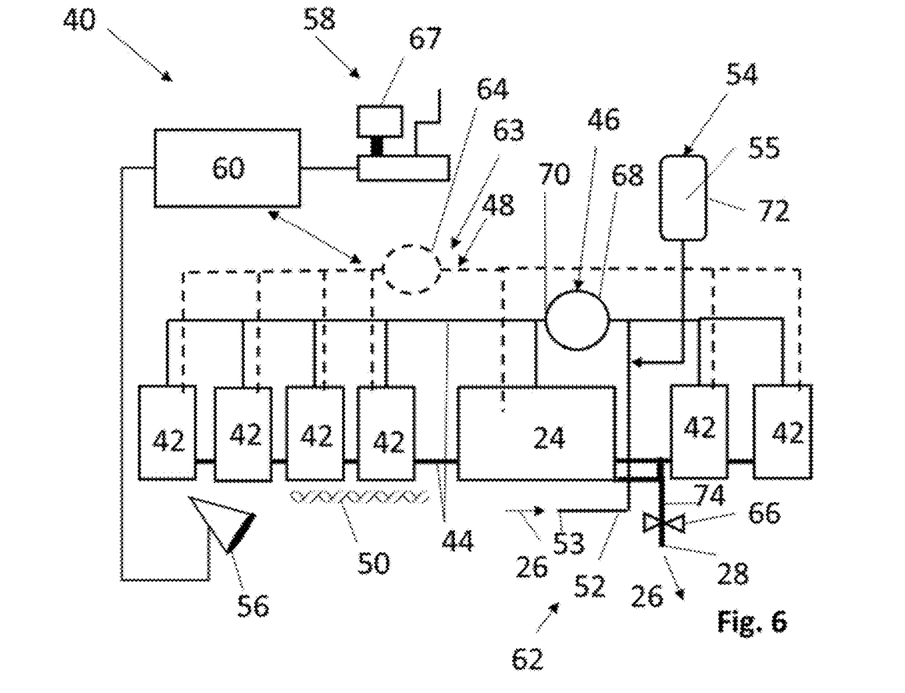
FIG. 6 shows a block representation of firefighting aircraft equipment.

The firefighting aircraft equipment 40 of the passenger aircraft 10 has a device 62 for the rapid filling and discharging of a liquid extinguishing medium 26. This is formed by the extinguishing medium nozzle 28, the liquid filling system 52 with the extinguishing medium line system 44 and the pumping device 46 and by the ventilation system 48.

The extinguishing medium line system 44 has several extinguishing medium lines 45 installed in the cargo deck 18, in particular in the form of water supply pipes, which can be connected to the extinguishing medium containers 42 when they are installed and which, on the other hand, are connected to the pumping device 46 and the extinguishing medium tank 24 and/or the extinguishing medium nozzle 28. Furthermore, actuators, in particular valves, which are not specified in detail, are provided for controlling the flow of liquids.

The ventilation system 48 is designed to quickly feed air into the extinguishing medium tank 24 and, if appropriate, the extinguishing medium containers 42 when discharging the extinguishing medium 26 in order to avoid impairments of the structure die to pressure differences. In a preferred embodiment, the ventilation system 48 has an air pressure system 63, preferably with a compressed air source, for example a compressor 64, to introduce pressurized air (or where appropriate another pressurized gas) into the extinguishing medium tank 24 and/or the extinguishing medium containers 42 to support rapid discharging.

The discharging can additionally be supported by the angle of attack 76, so that the extinguishing medium 26 flows to the extinguishing medium nozzle 28.

The extinguishing medium nozzle 28 can be opened and closed by at least one valve 66 and is designed for discharging a large liquid flow. The extinguishing medium nozzle 28 is formed by the thick discharge pipe 74, in which at least one valve 66 is arranged for closing. The suction effect in the flight state supports the discharging and distribution of the extinguishing medium in the air above the major fire 22. Of course, several extinguishing medium nozzles 28 can be provided for faster discharging.

By means of the liquid filling system 52, an extinguishing medium 26, in particular water, can be filled into the extinguishing medium tank 24 and, if appropriate, into the extinguishing medium containers 42. For this purpose, a separate filler neck 53 may be provided. The system 54 for the addition of fire extinguishing medium additive is designed to add a fire extinguishing medium additive 55, such as a (usually red) marking paint and/or a means for flame suppression, when filling. Preferably, the liquid filling system 52 is permanently installed like the extinguishing medium tank 24. The system 54 for the addition of fire extinguishing medium additive can be permanently installed or, for example as ULDs, can be mobile and designed to be installed in the event of fire. It has a source, for example a storage tank 72 for extinguishing medium additive and connection cables. The system 54 is optionally provided, wherein in other versions if extinguishing medium additive is desired or prescribed for firefighting, the extinguishing medium additive can already be added to the extinguishing medium 26 outside the passenger aircraft 10.

The pumping device 46 has a pump 68 for an extinguishing medium 26 and connecting lines 70 and is designed to transport the extinguishing medium 26 via the lines of the extinguishing medium line system 44 between the extinguishing medium tank 24 and the extinguishing medium containers 42. It may also be designed to assist in discharging. In one design, the pumping device 46 is permanently installed, for example, in the cargo hold 32, 36. In another embodiment, the pumping device 46 is of mobile form, for example arranged on one of the extinguishing medium containers 42 or implemented as a separate ULD, which can be installed for use as a firefighting aircraft 20 and otherwise can be stored together with the extinguishing medium containers 42 at an airport.

The controller 60 controls the firefighting aircraft equipment 40, in particular its actuators, valves 66 and pumping device 46 according to pre-stored sequence programs according to commands by an operator who can enter them at the operator workstation 58 via a human-machine interface 67, for example a touchpad, a combination of a display device, for example a monitor or a display, and control elements such as keys, keyboard, joystick or the like. The camera 56 is directed at the area under the passenger aircraft 10 and thus at the target area of the extinguishing medium nozzle 28 to support the operator in operation.

The heating device 50 is designed for heating the extinguishing medium tank 24 and/or the cargo holds 32, 36 to avoid ice formation in the extinguishing medium.

Possible different modes of operation of the firefighting equipment 40 for firefighting are explained below on the basis of FIGS. 7 and 8.

Preferably, the firefighting is carried out according to one of the following modes of operation:

a) only the extinguishing medium from the main extinguishing medium tank 24 (for example 12900 l) is discharged directly (the extinguishing medium containers 42 are not required)

b) the main extinguishing medium tank 24 is discharged together with the, for example, six additional extinguishing medium containers 42 (for example 30800 l)

c) two individual discharge processes of for example 12900 l from the main extinguishing medium tank 24 are carried out, wherein a loop is flown between the discharge processes to fly over the major fire again, wherein the extinguishing medium 26 is transferred from the extinguishing medium containers 42 to the extinguishing medium tank 24 in order to have a second shot available—no separate refilling at the airport is necessary.

Figure 8:
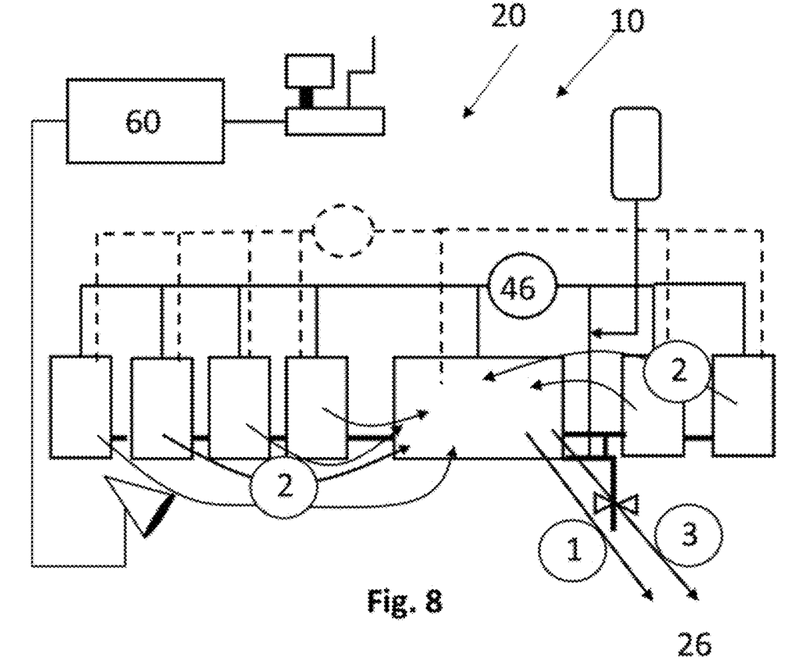
FIG. 8 shows the block representation of FIG. 6, in which a second possible mode of operation of the firefighting aircraft equipment is shown.

The mode of operation a) is indicated in FIG. 8 by the arrow (1). The discharge of the extinguishing medium tank 24 (for example 12900 l) takes place in a large shot, as also shown in FIG. 1. There is a very fast extinguishing medium release directly through the thick discharge pipe 74.

Figure 7:
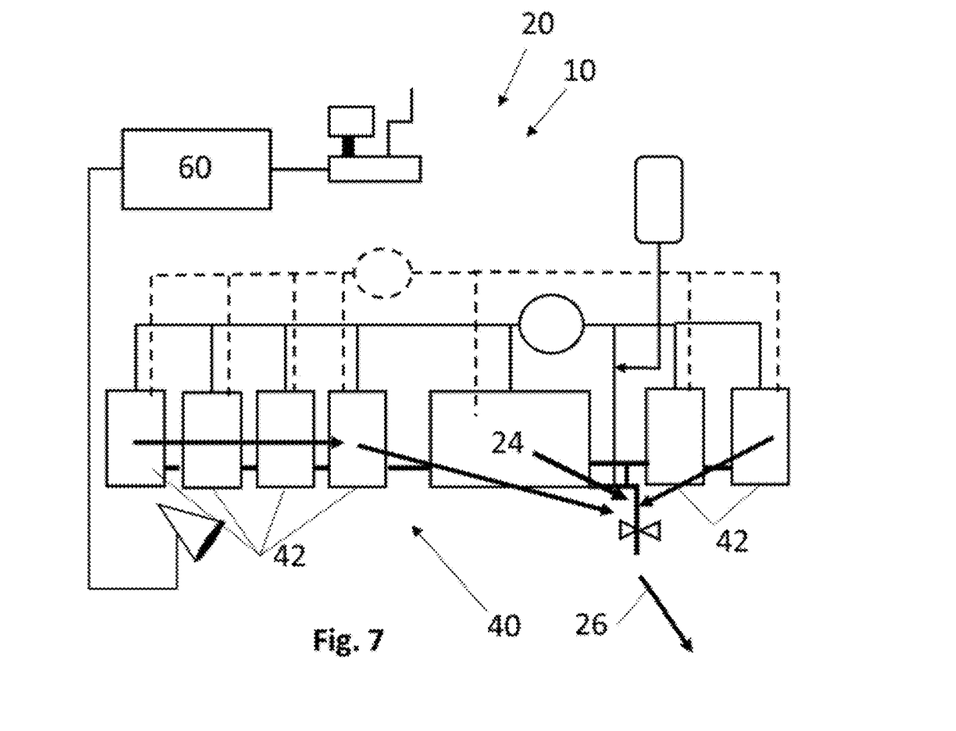
FIG. 7 shows the block representation of FIG. 6, in which a first possible mode of operation of the firefighting aircraft equipment is shown.

FIG. 7 shows the mode of operation b), in which all tanks 24, 42 are discharged. The entire liquid quantity of more than 30 tons of an extinguishing medium 26 (for example water) can be discharged in a single shot over a huge area. All tanks 24, 42 are emptied.

FIG. 8 also shows the mode of operation c), in which two (or even more) individual extinguishing medium discharge shots are carried out. First, as indicated by the arrow (1), the discharging of the extinguishing medium tank 24 takes place in a large shot, as is also done with a). Then, as indicated by the arrows (2), the extinguishing medium 26 is pumped through the pumping device 46 from the additional extinguishing medium containers 42 into the extinguishing medium tank 24 to allow a second shot from the main extinguishing medium tank 24. An additional return flight to the airport is not necessary.

Other combinations of discharging tanks 24, 42 are possible.

As mentioned above, in a preferred design, the passenger aircraft 10, which can also be used as a firefighting aircraft 20, is an aircraft, preferably a narrow-body aircraft (also called a standard fuselage aircraft), from a passenger aircraft series, such as the A320 family, wherein a center tank permanently installed as an additional tank in a long-haul aircraft of this series is used as an extinguishing medium tank 24.

Figure 9:
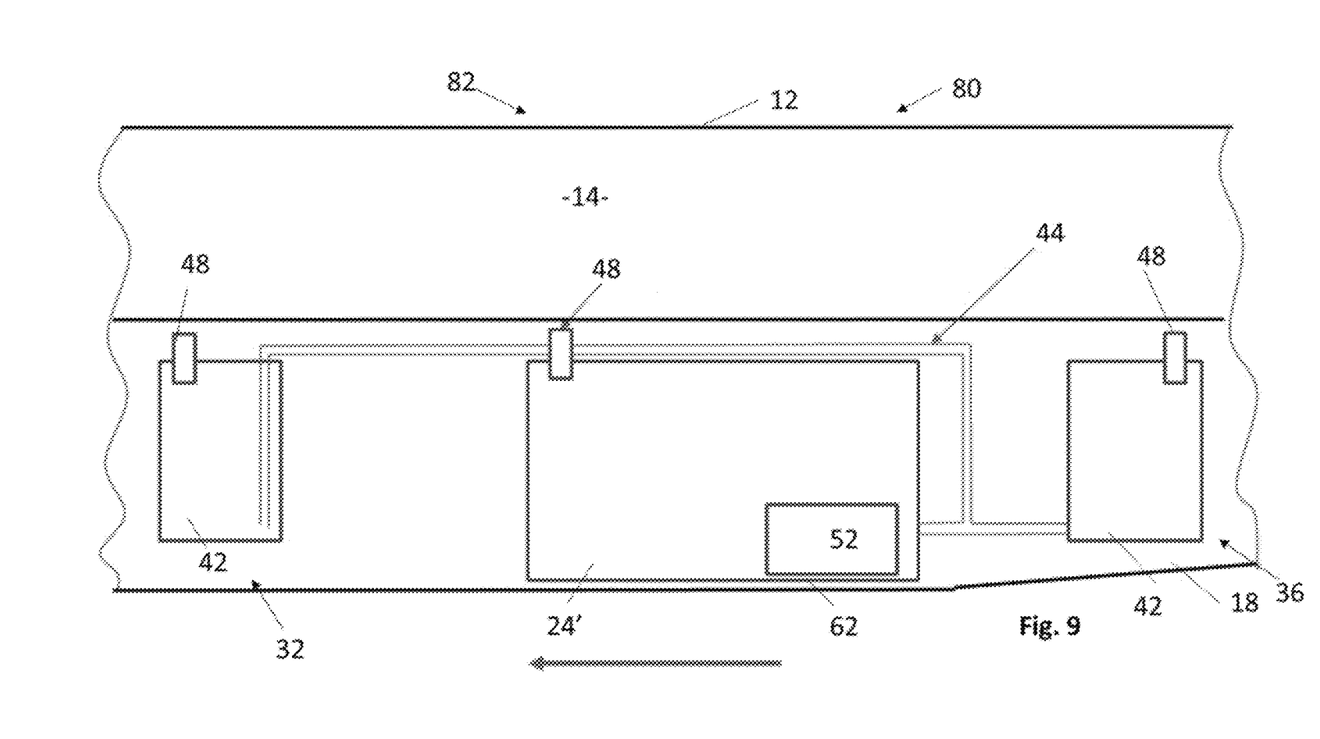
FIG. 9 shows a schematized block view of a central part of the fuselage of another passenger aircraft of the same passenger aircraft series as the passenger aircraft shown in FIGS. 1 to 8, in a configuration for transporting liquids.

FIG. 9 shows yet another passenger aircraft 80 of the same series as the passenger aircraft 10 in which the same center tank is used for yet another purpose. The other passenger aircraft 80 corresponds to the passenger aircraft 10 except for the differences illustrated in FIG. 9 compared to FIG. 4, namely the absence of the extinguishing medium nozzle 28, so that reference can be made to the above versions for the other features.

On the one hand, the other passenger aircraft 80—like the passenger aircraft 10—is designed for normal operation as a passenger aircraft. The center tank 24'—and if appropriate the additional liquid containers 42' (corresponding to the extinguishing medium containers 42) are used here for the transport of liquid such as water, fuel, ... used to supply remote stations. For this purpose, the liquid filling system 52 is not only designed for filling the center tank 24' and the additional liquid containers 42', but also for emptying the same, which can also be done via the filler neck 53.

So far, very few airlines carry out bulk liquid transport (for example, bulk fuel transport). For example, airlines such as Alkan Air, Air Tindi, Buffalo Airways and Air North transport fuel (no aviation fuel) for rural settlements or mine operators in northern Canada. For this purpose, the fuel is transported in hose-like flexible containers inside cargo aircraft. The passenger aircraft 80, on the other hand, can be used in normal operation for passenger transport and as an additional function (advantageous when transporting flammable liquids without passengers, but without conversion of the passenger cabin) as a tanker aircraft 82.

Although embodiments have been described using the example of the passenger aircraft series of the A320 Family, the ideas presented here are of course also transferable to other aircraft series, regardless of the manufacturer.

The invention concerns a multi-purpose aircraft which is designed on the one hand as a passenger aircraft 10 and on the other hand as a firefighting aircraft 20. The passenger aircraft 10 comprises, in addition to a permanently seated passenger cabin 14, a permanently installed extinguishing medium tank 24 for holding an extinguishing medium 26 such as water and at least one extinguishing medium nozzle 28 connected to the extinguishing medium tank 24 for discharging the extinguishing medium 26. Preferably, the passenger aircraft 10 is a type from an aircraft series, which also has a long-haul aircraft, in which a permanently additionally installed center tank for range extension is provided. In the passenger aircraft shown here 10, the center tank is used as an extinguishing medium tank 24.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE CHARACTER LIST

10 Passenger aircraft
12 Fuselage
14 Passenger cabin
16 Passenger seat
18 Cargo deck
20 Firefighting aircraft
22 Major fire
24 Extinguishing medium tank
26 Extinguishing medium
28 Extinguishing medium nozzle
30 Central aisle
32 Front cargo hold
34 Wing
36 Rear cargo hold
38 Receiving location
40 Firefighting aircraft equipment
42 Extinguishing medium container
44 Extinguishing medium line system
45 Extinguishing medium line
46 Pumping device
48 Ventilation system
50 Heating device
52 Liquid filling system
53 Filler neck
54 System for the addition of fire extinguishing medium additive
55 Fire extinguishing medium additive
56 Camera
58 Operator workstation
60 Controller
62 Device for filling and discharging
63 Air pressure system
64 Compressor
66 Valve
67 Human-machine interface
68 Pump
70 Connection cables
72 Storage containers
74 Discharge pipe
76 Angle of attack
80 Passenger aircraft
82 Tanker aircraft

The invention claimed is:

1. A passenger aircraft configured as a long-haul aircraft having a flight range of at least 8000 kilometers, comprising:
   a passenger cabin with at least twenty passenger seats,
   a cargo deck beneath the passenger cabin,
   a permanently installed tank located in the cargo deck for carrying an additional fuel to increase the flight range of the passenger aircraft, wherein the permanently installed tank is reconfigured to hold a fire extinguishing medium,
   a plurality of mobile extinguishing medium containers located fore and aft of the permanently installed tank fluidically coupled therewith,
   the fire extinguishing medium for firefighting a fire within the permanently installed tank and each of the plurality of mobile extinguishing medium containers, and
   at least one extinguishing medium nozzle connected to the permanently installed tank for discharging the extinguishing medium over the fire.

2. The passenger aircraft, according to claim 1, wherein the permanently installed tank has at least one of the following features:

is housed in an area of a fuselage of the passenger aircraft extending from wings of the aircraft to a rear cargo hold of the cargo deck,
has a tank volume of at least 600 liters,
has a tank volume between 1000 liters and 20000 liters,
is an extinguishing water tank for holding extinguishing water as the fire extinguishing medium, or
is a rear center tank of the passenger aircraft.

3. The passenger aircraft according to claim 1, wherein the cargo deck has at least one or more of the following features:
   has several receiving locations for receiving and anchoring each of the plurality of mobile extinguishing medium containers,
   has a front cargo hold in front of the permanently installed tank and a rear cargo hold behind the permanently installed tank,
   is configured to receive and anchor one to twenty of the plurality of mobile extinguishing medium containers, each with an extinguishing medium volume of 400 liters to 4000 liters, or
   has extinguishing medium lines which can be connected to the plurality of extinguishing medium containers and are connected to at least one of the permanently installed tank or the extinguishing medium nozzle.

4. The passenger aircraft according to claim 1, wherein the passenger cabin has at least one of the following features:
   10 to 50 rows of passenger seats, or
   is formed as a single-aisle passenger cabin.

5. The passenger aircraft according to claim 1, including at least one of the following features:
   at least one camera for observing an area below the passenger aircraft,
   at least one operator workstation for an operator with a human-machine interface for operating firefighting aircraft equipment of the passenger aircraft including the extinguishing medium nozzle and the permanently installed tank;
   a pumping device configured to transport the fire extinguishing medium at least one of to and from the permanently installed tank or to the at least one extinguishing medium nozzle,
   a ventilation system to feed air when the extinguishing medium is discharged,
      each of the plurality of mobile extinguishing medium containers is formed as unit load devices,
   an extinguishing medium line system with pipelines and valves for discharging the fire extinguishing medium and transporting the fire extinguishing medium to the permanently installed tank,
   a heating device for at least one of the permanently installed tank and/or the cargo deck,
   a liquid filling system for filling the permanently installed tank,
   an air pressure system configured to control a pressure in the permanently installed tank,
   a fire extinguishing medium additive, or
   a system for addition of a fire extinguishing medium additive.

6. The passenger aircraft according to claim 1, wherein the extinguishing medium nozzle has at least one or more of the following features:
   opens outwards underneath a fuselage,
   is located behind wings,
   has a valve for opening and closing,
   is formed by a discharge pipe, or
   is configured to discharge contents of the permanently installed tank or of the permanently installed tank and at least one additional mobile extinguishing medium container of the plurality of mobile extinguishing medium container in one shot.

7. An operating method for a passenger aircraft according to claim 1, comprising:
   operating the passenger aircraft as a commercial aircraft for a transport of passengers, and
   upon an occurrence of the fire, filling the permanently installed tank with the fire extinguishing medium and operating the passenger aircraft as a firefighting aircraft.

8. The operating method according to claim 7, wherein the extinguishing medium is discharged according to one of the following modes of operation:
   (a) discharging contents of the permanently installed tank in one shot;
   (b) discharging contents of the permanently installed tank and at least one additional mobile extinguishing medium container of the plurality of mobile extinguishing containers in one shot; or
   c) discharging contents of the permanently installed tank in a first shot, pumping further extinguishing medium from the at least one additional mobile extinguishing medium container of the plurality of mobile extinguishing medium containers into the extinguishing medium tank and then discharging the refilled contents of the permanently installed in a second shot.

9. A passenger aircraft series including several passenger aircraft with the same external structure including fuselage, landing gear, wings and tail unit; wherein a passenger cabin is arranged in the same fuselage in each aircraft to accommodate passenger seats, a cargo deck and a center tank of the same contour, arrangement and dimensions; wherein the passenger aircraft series includes a first long-haul passenger aircraft with an extended range in which the center tank is configured for use as an additional fuel tank, and a second passenger aircraft usable as a firefighting aircraft according to claim 1, wherein the center tank comprises the extinguishing medium tank.

10. The passenger aircraft series according to claim 9, including at least one of:
   a third passenger aircraft additionally usable as a tanker aircraft in which the center tank is configured as a liquid tank for delivery of liquid from a supply point to a remote station, or
   a fourth short-haul or medium-haul passenger aircraft that corresponds to a third passenger aircraft, but without the additional center tank.

11. A passenger aircraft series according to claim 9 comprising a narrow-body aircraft series.

* * * * *